US 6,512,411 B2

(12) United States Patent
Meng et al.

(10) Patent No.: US 6,512,411 B2
(45) Date of Patent: Jan. 28, 2003

(54) CHARGE PUMP MODE TRANSITION CONTROL

(75) Inventors: David D. Meng, Mountain View, CA (US); Charles R. Thurber, Jr., Sunnyvale, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 10/095,899

(22) Filed: Mar. 11, 2002

(65) Prior Publication Data

US 2002/0130705 A1 Sep. 19, 2002

Related U.S. Application Data

(63) Continuation-in-part of application No. 09/715,949, filed on Nov. 17, 2000, now abandoned, which is a continuation-in-part of application No. 09/369,670, filed on Aug. 5, 1999.

(51) Int. Cl.[7] .......................... G05F 1/563; G05F 1/575
(52) U.S. Cl. .................. 327/536; 327/543; 307/110; 363/60
(58) Field of Search .................. 327/536, 537, 327/538, 540, 541, 543; 307/110; 363/59, 60

(56) References Cited

U.S. PATENT DOCUMENTS

| | | | | |
|---|---|---|---|---|
| 5,475,296 A | * | 12/1995 | Vinsant et al. | 323/283 |
| 5,831,418 A | * | 11/1998 | Kitagawa | 323/222 |
| 5,920,226 A | * | 7/1999 | Mimura | 327/537 |
| 5,973,944 A | * | 10/1999 | Nork | 363/60 |
| 6,043,695 A | * | 3/2000 | O'Sullivan | 327/157 |
| 6,169,444 B1 | * | 1/2001 | Thurber, Jr. | 327/536 |
| 6,226,193 B1 | * | 5/2001 | Bayer et al. | 363/59 |
| 6,242,970 B1 | * | 6/2001 | Grant et al. | 327/536 |
| 6,370,046 B1 | * | 4/2002 | Nebrigic et al. | 327/536 |

OTHER PUBLICATIONS

Linear Technology Corporation, LTC1514–3.3/LTC1514–5 Step–Up/Step–Down Switched Capacitor DC/DC Converters with Low Battery Comparator, pp 1–8, 1997.*

* cited by examiner

Primary Examiner—Timothy P. Callahan
Assistant Examiner—Terry L. Englund
(74) Attorney, Agent, or Firm—Perkins Coie LLP (57) ABSTRACT

A mode transitioning system (10) for a charge pump (12), which may optionally be embodied in an integrated circuit (28). A number of switches (30a–i) are operated based on an input detection sub-circuit (32) and an output detection sub-circuit (34) to controllably connect a number of flying capacitors (24, 26) in a variety of manners producing alternate input voltage to output voltage step ratios. One example embodiment of the mode transitioning system (10) proceeds from an idle state (52a), through start-up and fault testing states (52b–c), and then selects among alternate step-down ratios of 1:1, 2:3, and 1:2 based on suitability and efficiency for respective operating states (52d–f).

20 Claims, 5 Drawing Sheets

CHARGE PUMP MODE TRANSITION CONTROL

CROSS-REFERENCE TO RELATED APPLICATIONS

This application is a continuation-in-part of U.S. patent application Ser. No. 09/715,949 now abandoned, filed on Nov. 17, 2000, which is itself a continuation-in-part of U.S. patent application Ser. No. 09/369,670, filed on Aug. 5, 1999, which by this reference is incorporated herein in its entirety.

TECHNICAL FIELD

The present invention relates generally to power supplies for electronic systems, and more particularly to efficient operation of charge pumps, which are commonly used in such power supplies, by controlling the transitioning of such charge pumps between multiple modes of operation.

BACKGROUND ART

Electronic circuits today often require power in one or more direct current (DC) voltage ranges. To supply such needs it is typical to convert power from a single source, perhaps a battery or another DC supply already obtained from an alternating current source. Various systems exist for performing such power conversion, including the charge pump. A charge pump is a capacitor and oscillator based circuit which converts a DC input to a DC output which is either higher, lower, or inverted in voltage value.

Figure 1A:
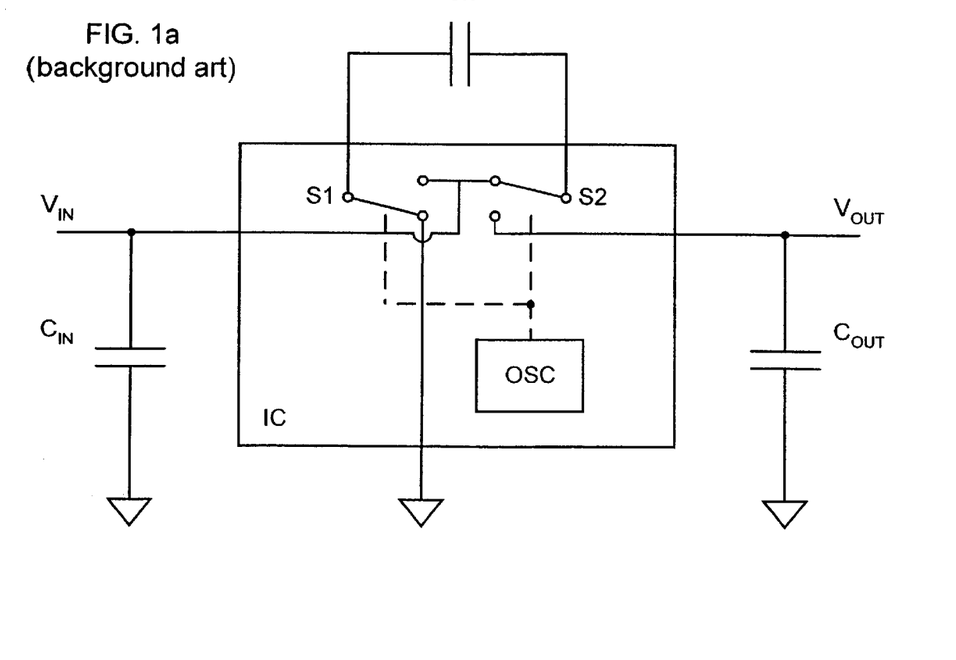
FIGS. 1a–b (background art) respectively are circuit diagrams of a common single capacitor step-up type charge pump and a less common multiple capacitor step-down type charge pump.

FIG. 1a (background art) is a circuit diagram of a very simple charge pump. An oscillator (OSC) controls two switches (S1 and S2) to alternately charge a flying capacitor (Cx) from an input voltage ($V_{IN}$) supplied across an input capacitor ($C_{IN}$), and to discharge the flying capacitor (Cx) into an output capacitor ($C_{OUT}$). The voltage thus produced across the output capacitor becomes an output voltage ($V_{OUT}$). The oscillator, switches, and still other controls are all commonly contained in an integrated circuit (IC) today.

The charge pump in FIG. 1a is of the step-up type, and it operates by stacking the potential of the charge in the flying capacitor onto the potential of the input, and then charging the output capacitor with this. The optimal result of this is an output voltage which is double that of the input voltage.

Those skilled in the electronic arts will readily appreciate that switched connections to the flying capacitor can be changed to simply shift charge from the input to the output, rather than to stack it as above. One very common type of step-down charge pump operates in this way, but further includes an appreciable resistance in the charge path to the flying capacitor. The resistance intentionally introduces a delay in the charging of the flying capacitor, and appropriate control of the oscillator is then used to switch the charge before it is able to reach the full input voltage potential. This type of charge pump may accordingly transfer charge quanta having only one-half, two-thirds, etc. of the input voltage, and thereby produce an output voltage which is correspondingly lower than the input voltage. This type of step-down charge pump is probably overwhelmingly the most common today, but it is not the only type possible.

Figure 1B:
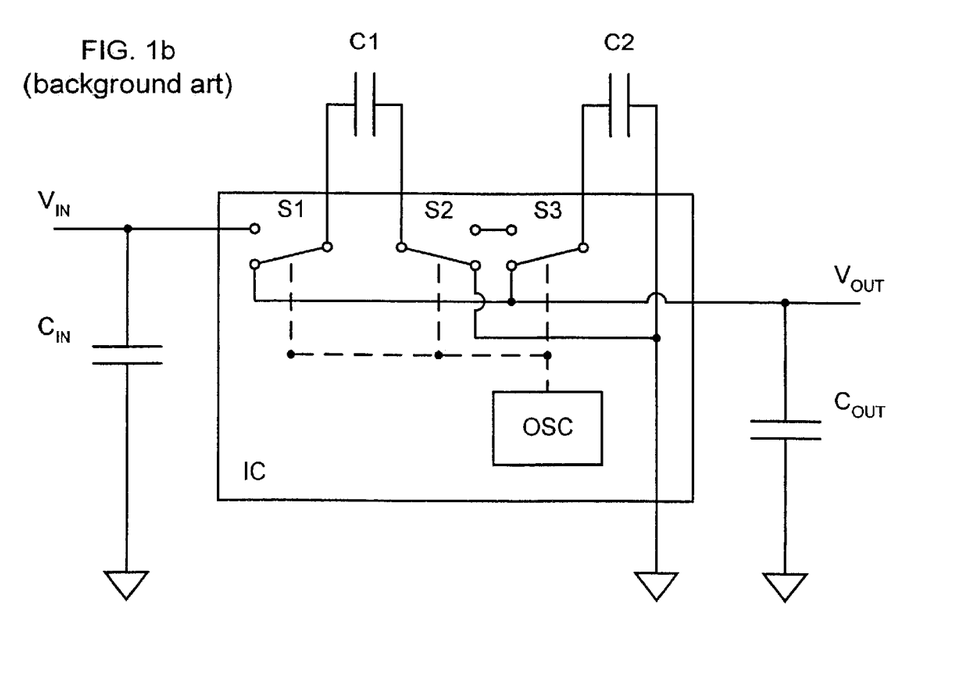

FIG. 1b (background art) is a circuit diagram of a less common type of step-down charge pump. An oscillator (OSC) controls switches (here S1, S2, and S3) to alternately charge two flying capacitors (C1 and C2) from an input voltage ($V_{IN}$) which is supplied across an input capacitor ($C_{IN}$). For charging, the two flying capacitors are connected in series by the switches across the input capacitor. However, for discharging, the two flying capacitor are each connected in parallel by the switches across an output capacitor ($C_{OUT}$). This accordingly produces an output voltage ($V_{OUT}$), but one which is nominally only one-half that of the input voltage. Since the two flying capacitors are charged in series to the total input voltage, so that they each reach roughly half of that voltage, this is all of the potential that either can subsequently contribute toward creating the output voltage. FIG. 1b depicts the switches set for the discharge cycle of this process.

Several dynamic conditions may occur in electronic circuits, and it may be necessary or desirable for a charge pump to adapt conversion of a DC input to a DC output differently in response to such conditions. For example, the input voltage can change. If a battery is used for the input, simple battery discharge will cause the input voltage to drop. Or the output load may change, creating a need to supply increased charge quanta to the output capacitor to prevent the output voltage from dropping too low, i.e., dropping out of regulation.

Constructing charge pumps which are capable of transitioning between different operating modes is not particularly difficult. Some common examples of this are charge pumps which alternately perform either step-up or step-down conversion (sometimes also respectively called boost and buck operation), as needed, or charge pumps which alternately switch between step-up multiples of the input voltage, e.g., from 2x to 3x modes.

Unfortunately, providing charge pumps which can operate in multiple such modes efficiently is not easily accomplished. Inefficiency is generally undesirable, and it can be a severe limitation when using charge pumps with battery and other limited power sources. Accordingly, what is needed are improved systems, apparatus, and methods for providing efficient multiple mode charge pumps.

DISCLOSURE OF INVENTION

Accordingly, it is an object of the present invention to provide a transitioning system for efficient multiple mode operation of charge pumps.

Another object of the invention is to provide a transitioning system for multiple mode operation of charge pumps which works efficiently across a wide range, and preferably the total range, of appropriate output loads likely to be encountered by particular circuits employing the charge pumps.

Another object of the invention is to provide;a transitioning system for multiple mode operation of charge pumps which maintains high efficiency and high output current capability consistently.

And another object of the invention is to provide a system for multiple mode operation of charge pumps which transitions automatically between such modes in a manner supplying high efficiency or high output current, as may be appropriate for particular output loads.

Briefly, one preferred embodiment of the present invention is a method for operating a charge pump to convert an input voltage in an input signal to an output voltage in an output signal. The charge pump includes an oscillator which produces clock cycles and a number of flying capacitors which are charged during first half clock cycles and discharged during the other half clock cycles. The method operates the charge pump for at least one clock cycle in a first step mode defined by particular interconnection and combination of the flying capacitors both while they are charged and discharged. Next it is determined if the charge pump is within regulation, based upon whether the output voltage is within a desired range. Then the input voltage and the output voltage are compared to determine if the charge pump can operate in a second step mode, which is defined by a different unique interconnecting combination of the flying capacitors as they are first charged and then discharged. Finally, the charge pump may transition from operation in the first step mode to operation in the second step mode if it is in regulation and if it is also determined that it can operate in the second step mode.

An advantage of the present invention is that it does provide an efficient, automatically operating transitioning system for multiple mode operation of charge pumps, one able to accommodate a full range of charge pump input conditions and output loads.

Another advantage of the present invention is that it may be largely monolithically implemented. The invention may be incorporated into monolithic integrated circuit type charge pump designs without the need for additional discrete components or resorting to non-monolithic assemblies. Yet the invention may also use discrete components or non-monolithic assemblies, or be integrated into charge pump designs which use such for other purposes, if a designer so wishes.

Another advantage of the present invention is that it may be implemented using widely understood and economical integrated circuit digital logic.

And another advantage of the invention is that it also reduces output voltage ripple when the output voltage is close to the input voltage at light and medium output load currents.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

A preferred embodiment of the present invention is a system for charge pump transition control between multiple modes of operation. As illustrated in the various drawings herein, and particularly in the view of FIG. 2, a form of this preferred embodiment of the inventive device is depicted by the general reference character 10.

Before describing a preferred embodiment of the inventive mode transitioning system 10, as applied in an example charge pump 12, some brief theoretical discussion is appropriate. While charge pumps are inherently analog circuits, what is ultimately needed here is a mechanism for choosing between multiple modes of operation, say, step-down ratios between an input voltage ($V_{IN}$) and an output voltage ($V_{OUT}$) of 1:1, 2:3, and 1:2. Viewed from this perspective, the problem has aspects suitable for the application of Boolean logic, and digital methods may be useful in some aspects of its solution. Further, since a charge pump employs an oscillator typically operating at a high frequency, a "clock" for use in high speed digital logic is available.

The above suggests essentially the following heuristic approach. Initially operate the charge pump 12 in a manner to bring it into an essentially normal operating state safely and rapidly, i.e., handle the start-up and any initial fault situations. Continuing with the three mode step-down example introduced above, this means bringing the charge pump 12 into 1:1 mode operation, which is its highest current mode but also its least efficient mode. Then try operating the charge pump 12 in its next more efficient mode. At this point that means trying the 2:3 ratio mode for one or more clock cycles. If this does not work, say, due to the presence of a heavy load, the output voltage will drop out of regulation and the charge pump 12 must be returned to operation in the previous, less efficient mode for one or more clock cycles. Alternately, if this does work, i.e., the charge pump 12 is within regulation, then a still next more efficient mode may be tried. With our example charge pump 12 in 2:3 mode, this means now trying the 1:2 mode. Again, if this does not work the output voltage will drop out of regulation and the charge pump 12 must be returned to the previous, less efficient mode for one or more clock cycles. But if this does work, the charge pump 12 will be operating in its most efficient mode and it can be left there as long as some condition, say, a change in loading, does not occur.

The above is, however, a quite simplistic statement of the present inventive approach. For example, analyzing the relationship between the input and output voltages, or the operating history of the charge pump 12 across a few recent clock cycles, may further be used to determine when to even attempt a more efficient mode. A more detailed explanation of such a preferred embodiment is now provided.

Figure 2:
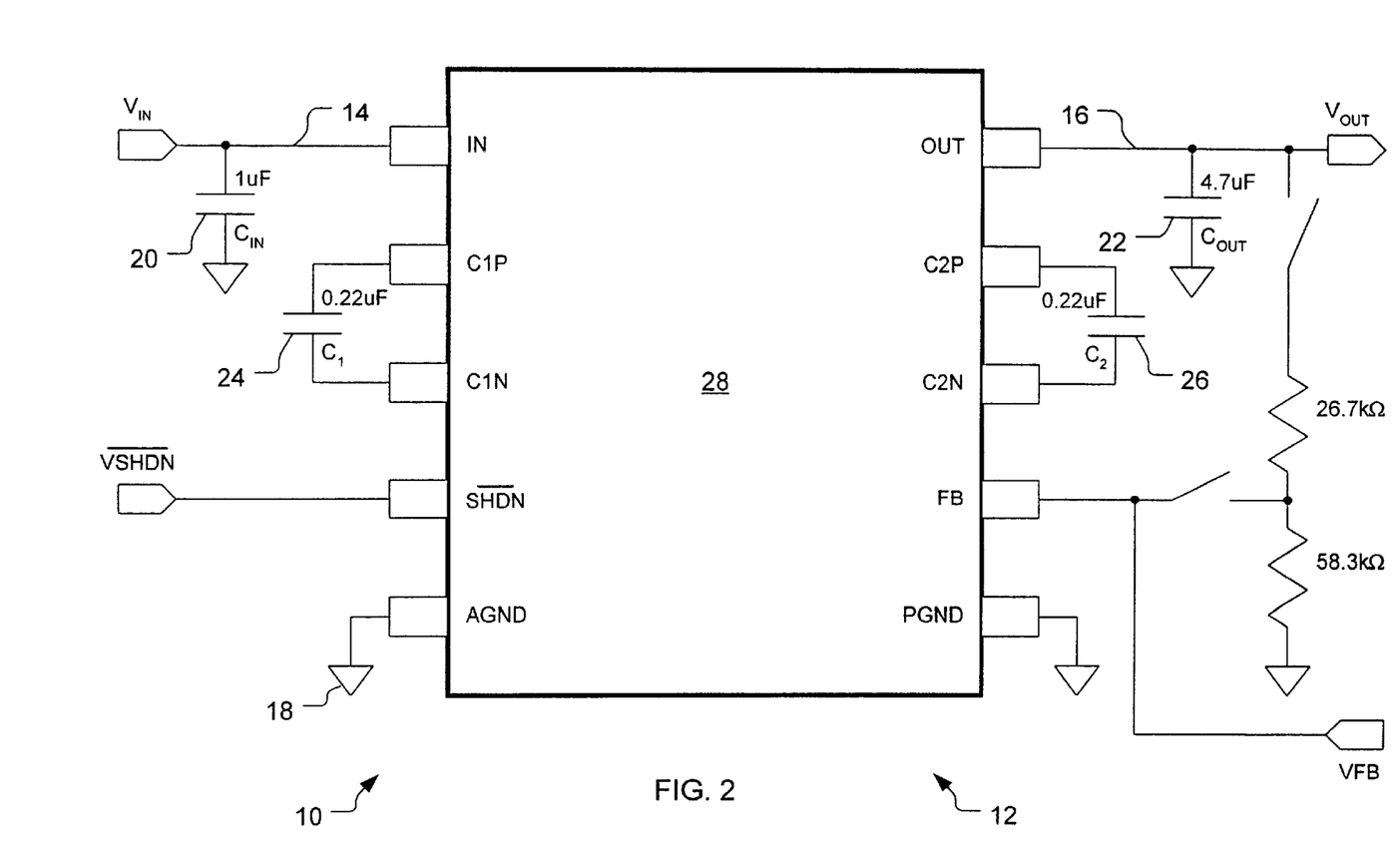
FIG. 2 is a circuit diagram of a charge pump employing an integrated circuit embodiment of the present invention.

FIG. 2 is a circuit diagram of a charge pump 12 employing the inventive mode transitioning system 10. An input terminal 14, an output terminal 16, and a common terminal 18 are provided. A suitable direct current (DC) input voltage ($V_{IN}$) may be applied across the input terminal 14 and the common terminal 18, and the charge pump 12 will produce a DC output voltage ($V_{OUT}$) across the output terminal 16 and the common terminal 18. For use as an input reservoir an input capacitor 20 ($C_{IN}$) is connected across the input terminal 14 and the common terminal 18, and for use as an output reservoir an output capacitor 22 ($C_{OUT}$) is connected across the output terminal 16 and the common terminal 18. The input capacitor 20 is theoretically optional, but in practice one is almost always used in charge pumps, and the input of the circuit always has some intrinsic capacitance anyway. For providing the distinctive charge pump capability, a first flying capacitor 24 ($C_1$) and a second flying capacitor 26 ($C_2$) are included. These components connect together in the manner shown with an integrated circuit 28 which controls and completes the charge pump 12.

FIG. 2 shows the charge pump 12 including external components having representative values and the integrated circuit 28 having additional pins (e.g., !SHND and FB) for various options. These are included here for completeness, but are not particularly germane to the underlying inventive mode transitioning system 10.

Figure 3:
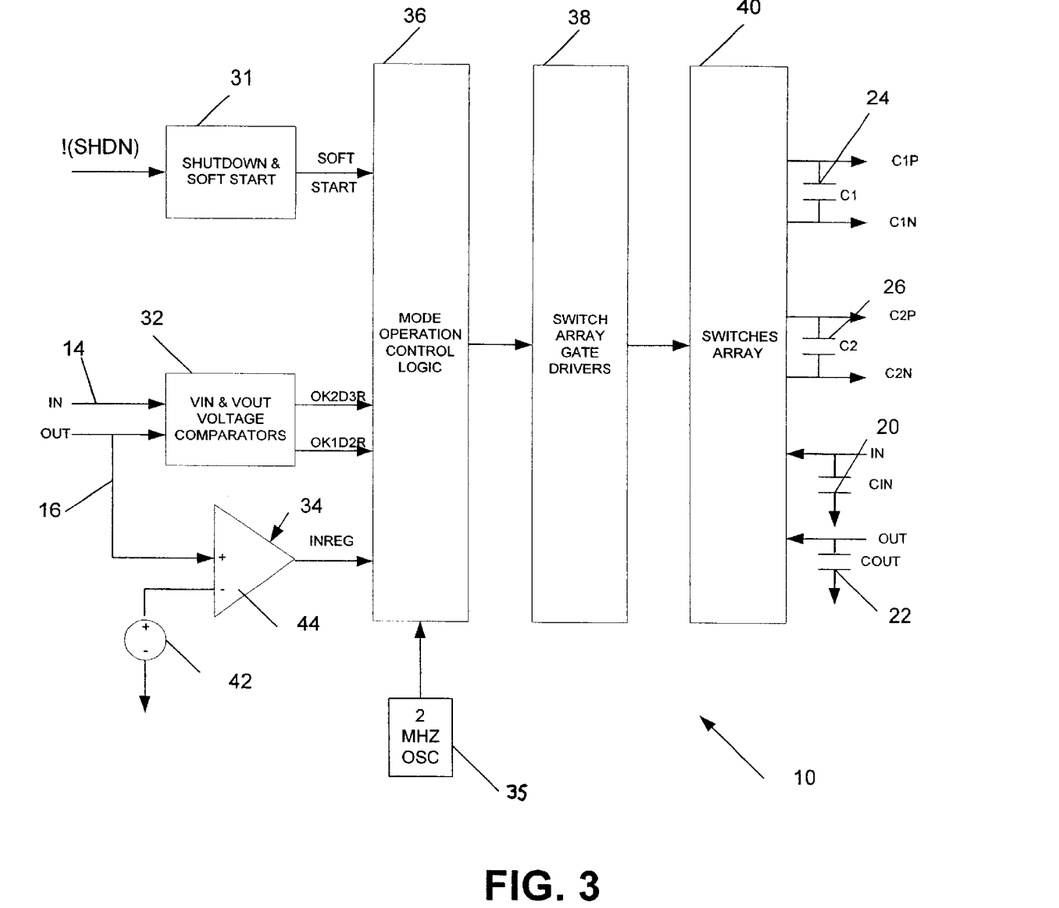
FIG. 3 is a diagram conceptually showing block diagram of the integrated circuit embodiment of FIG. 2.

FIG. 3 is a diagram conceptually showing block diagram of the integrated circuit embodiment of FIG. 2. The block diagram of the integrated circuit of one embodiment of the present invention includes a shutdown and soft start 'sub-circuit 31, an input detection sub-circuit 32 (also refered to as $V_{IN}/V_{OUT}$ comparator), an output detection sub-circuit 34 (reference voltage comparator sub-circuit), a mode operation control logic sub-circuit 36, an oscillator sub-circuit 35, a switch array gate driver sub-circuit 38, and a switch array sub-circuit 40. In one embodiment the switch array sub-circuit 40 comprises of switches 30a–30i, connecting to the input $C_{IN}$ 20, the output $C_{OUT}$ 22, and the flying capacitors C1 24 and C2 26, the input terminal 14, the output terminal 16, the common terminal 18, and to each other, in a variety of different ways, based on the mode of operation.

The shutdown and soft start sub-circuit 31 receives a !(SHDN) signal and outputs a shutdown or soft start signal to the mode operation control logic 36. The exclamation signal is used as the "NOT" logical operator herein.

The output detection sub-circuit 34 is provided to monitor the output voltage. A signal from an oscillator 35 (Osc) together with a signal from the input detection sub-circuit 32 are used as inputs to the mode operation control logic 36.

The output detection sub-circuit 34 and oscillator 35 operate in generally conventional manner in charge pumps. The output detection sub-circuit 34 includes a voltage reference 42 (Ref) and a comparator 44. At its positive input the comparator 44 receives a voltage from the output terminal 16, and at its negative input the comparator 44 receives a voltage from the voltage reference 42. When the voltage from the voltage reference 42 exceeds that from the output terminal 16, the comparator 44 produces a positive difference signal at its output, INREG. This difference signal INREG is made available to the mode operation control logic block 36.

The mode operation control logic sub-circuit 36 receives and uses input from the shutdown and soft start sub-circuit 31, the input detection sub-circuit 32, the output detection sub-circuit 34, and the oscillator 35 , and determines the appropriate mode of operation based on the inputs.

The mode transitioning system 10 of FIG. 2 and 3 (and as will soon be seen, particularly also FIG. 4a–f) can provide step-down modes of 1:1, 2:3, and 1:2. When $V_{IN} \geq V_{OUT}$ a 1:1 mode is appropriate, i.e., no step-down, just a simple charge transfer. However, the 1:1 mode is also the least efficient mode for this embodiment, and while it may be available it may not be desirable. When $V_{IN} \geq (V_{OUT} \times 1.5)$ a 2:3 mode is also appropriate and since it is more efficient than a 1:1 mode it is preferable. When $V_{IN} \geq (V_{OUT} \times 2)$ a 1:2 mode is still further appropriate and since it is more efficient than either of the 1:1 or the 2:3 modes it is the most preferable.

The mode operation control logic sub-circuit 36 determines the appropriate mode of operation based on the signal generated by the input detection circuit 32 by comparing the magnitude of the input voltage and the output voltage to each other.

The mode operation control logic sub-circuit 36 in turn controls the switch array gate drivers sub-circuit 38, which in turn control the switches array 40. In one embodiment of the present invention, a series of nine switches 30a–30i (see FIG. 4a–f) provide the interconnection between each other and the external first flying capacitor 24, the external second flying capacitor 26, the input terminal 14, the output terminal 16, and the common terminal 18. In one embodiment, the switches 30a–30i are MOSFET devices, and may include both n-channel and pc-channel type devices.

Each operating mode of the charge pump device corresponds to a particular arrangement and connection of the switch array sub-circuit 40 and the input $C_{IN}$, the output $C_{OUT}$, the flying capacitors C1 and C2, the input terminal 14, the output terminal 16, the common terminal 18. The switch array gate drivers sub-circuit 38 controls the interconnections of the external capacitors and the switch array sub-circuit 40.

The switch array sub-circuit 40 is controlled by the switch array gate driver sub-circuit 38. The plurality of switches of the switch array sub-circuit 40 from the actual connections between the flying capacitors (24 and 26) and the input and output capacitors (20 and 22), as well as the input terminal 14 and the output terminal 16. The various modes of operation and the interconnections of the switches array 40 corresponding to the different modes of operation of the mode transitioning system 10 are further described in FIG. 4a–f and FIG. 5.

FIG. 3 presents merely a suitable hardware embodiment for implementing the embodiment of FIG. 4a–f, which in turn is merely a three step-down mode conceptual embodiment of the much broader inventive mode transitioning system 10. Accordingly, the embodiments FIG. 2–3 and FIG. 4a–f are just examples of the invention and the limitations therein should not be mistakenly used when interpreting the true scope and spirit of the present invention.

Figure 4A:
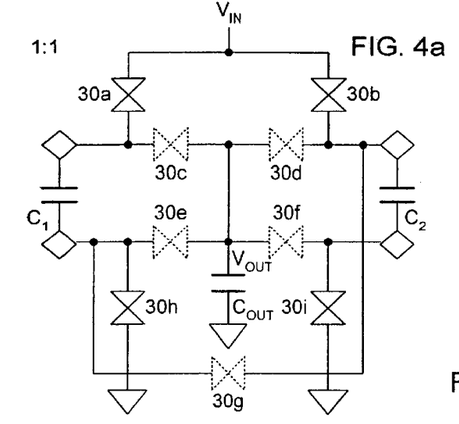
FIGS. 4a–f are conceptual diagrams of the flying capacitor switching for the embodiment of FIG. 2 and 3, with FIG. 4a–b showing charging and discharging in a 1:1 step-down mode, FIG. 4c–d showing charging and discharging in a 2:3 step-down mode, and FIG. 4e–f showing charging and discharging in a 1:2 step-down mode.
Figure 4B:
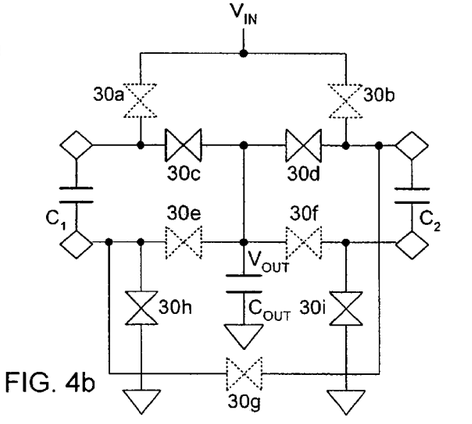
Figure 4C:
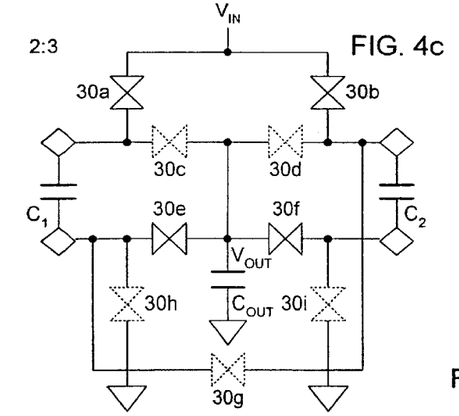
Figure 4D:
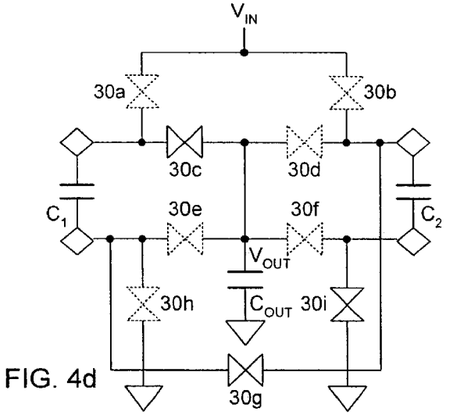
Figure 4E:
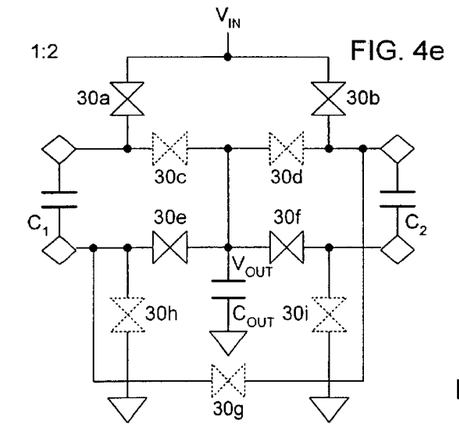
Figure 4F:
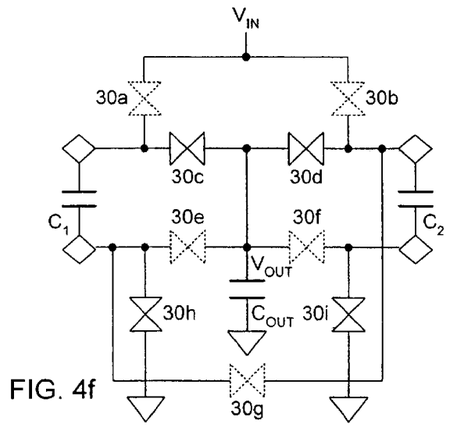

FIG. 4a–f are conceptual diagrams of the flying capacitor switching for the embodiment of FIG. 2 and 3, with FIG. 4a–b showing charging and discharging in a 1:1 step-down mode, FIG. 4c–d showing charging and discharging in a 2:3 step-down mode, and FIG. 4e–f showing charging and discharging in a 1:2 step-down mode.

With reference to FIG. 4a, the mode transitioning system 10 provides the 1:1 step mode charge cycle. During this charge cycle, which is the first half of a cycle in the clock signal, the switch 30a, switch 30b, switch 30h, and switch 30i (see FIG. 4a) are all turned on. Both of the flying capacitors (24 and 26) then charge to the input voltage ($V_{IN}$). In all of FIG. 4a–f, the switches shown in ghost form are those which are off. In FIG. 4a the flying capacitors (24 and 26) are connected in parallel across the input terminal 14 and the common terminal 18, and they become charged to the input voltage ($V_{IN}$).

With reference to FIG. 4b, during a discharge cycle, which is the subsequent second-half cycle of the clock signal, the switch 30c, switch 30d, switch 30h, and switch 30i are all turned on. The charges in both of the flying capacitors (24 and 26) are then collectively discharged across the output capacitor 22. The clock signal is generated using the oscillator 35.

This can conceptually be seen in FIG. 4a–b, wherein the respective charge and discharge cycles of the 1:1 step mode are shown. In all of FIG. 4a–f, the switches shown in ghost form are those which are off. In FIG. 4a the flying capacitors (24 and 26) are connected in parallel across the input terminal 14 and the common terminal 18, and they become charged to the input voltage ($V_{IN}$). In FIG. 4b the flying capacitors (24 and 26) are connected in parallel across the output terminal 16 and the common terminal 18, and they discharge into the output capacitor 22. Those skilled in the electronic arts will readily recognize that this is simply a voltage or charge transfer type of operation.

Returning to FIG. 4, the mode transitioning system 10 can alternately provide a 2:3 step mode operation.

In FIG. 4c, during a charge cycle, which is the first-half of a cycle in the clock signal 40, the switch 30a, switch 30b, switch 30e, and switch 30f are all turned on. Both of the flying capacitors (24, 26) then charge to the difference between the input voltage and the output voltage ($V_{IN}-V_{OUT}$).

As shown in FIG. 4d, during a discharge cycle, which is the subsequent second-half cycle of the clock signal, the switch 30c, switch 30g, and switch 30i are all turned on. The charge in the first flying capacitor 24 is then stacked onto that in the second flying capacitor 26 and this is collectively discharged into the output capacitor 22.

This can conceptually be seen in FIG. 4c–d, wherein the respective charge and discharge cycles of the 2:3 step mode are shown. In FIG. 4c the flying capacitors (24, 26) are connected in parallel with each other across the input terminal 14 and the output terminal 16, and further in series with the output capacitor 22 at the output terminal 16. The flying capacitors (24, 26) are thus both charged to the difference between the input voltage and the output voltage ($V_{IN}-V_{OUT}$). In FIG. 4d the flying capacitors (24, 26) are connected in series (particularly note how switch 30g is closed here) across the output terminal 16 and the common terminal 18, and they discharge into the output capacitor 22.

Returning again to FIG. 4, the mode transitioning system 10 may still alternately provide a 1:2 step mode operation. As shown in FIG. 4e, during a charge cycle, which is the first-half of a cycle in the clock signal, the switch 30a, switch 30b, switch 30e, and switch 30f are all turned on. Both of the flying capacitors (24, 26) then charge to the difference between the input voltage and the output voltage ($V_{IN}-V_{OUT}$).

In FIG. 4f, during a discharge cycle, which is the subsequent second-half cycle of the clock signal, the switch 30c, switch 30d, switch 30h, and switch 30i are all turned on. The charges in both of the flying capacitors (24, 26) are then transferred into the output capacitor 22.

This can conceptually be seen in FIG. 4e–f, wherein the respective charge and discharge cycles of a 1:2 step mode are shown. In FIG. 4e the flying capacitors (24, 26) are connected in parallel with each other across the input terminal 14 and the output terminal 16, and further in series with the output capacitor 22 at the output terminal 16. The flying capacitors (24, 26) are thus both charged to the difference between the input voltage and the output voltage ($V_{IN}-V_{OUT}$). FIG. 4e is thus the same as FIG. 4c. In FIG. 4f the flying capacitors (24, 26) are connected in parallel across the output terminal 16 and the common terminal 18, and they discharge into the output capacitor 22. FIG. 4f is thus the same as FIG. 4b.

Summarizing, in FIG. 4a–b the flying capacitors (24, 26) are charged to the input voltage and then discharged across the output capacitor 22, making the output voltage the same as the input voltage under optimal conditions ($V_{IN}=V_{OUT}$). In FIG. 4c–d the flying capacitors (24, 26) are. both charged to the difference between the input voltage and the output voltage ($V_{IN}-V_{OUT}$). They are then series connected (i.e., stacked to produce $2*(V_{IN}-V_{OUT})$) and discharged in this manner across the output capacitor 22. The net result of this is an intermediate step mode between no step-down (1:1) and a voltage halving step-down (1:2). In FIG. 4e–f the flying capacitors (24, 26) are both charged to the difference between the input voltage and the output voltage ($V_{IN}-V_{OUT}$) and then discharged in parallel across the output capacitor 22. The net result of this is a voltage halving step-down (1:2).

Figure 5:
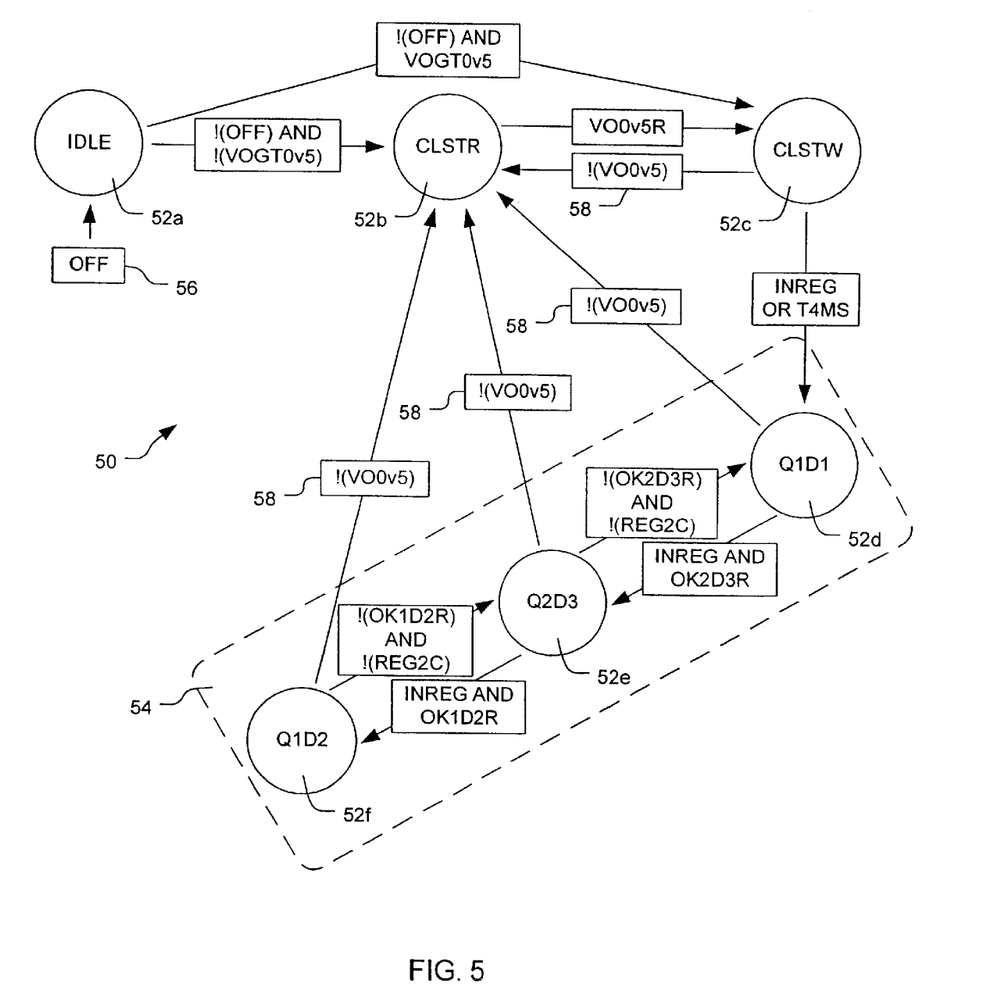
FIG. 5 is a state diagram of the mode transition logic for the embodiment of FIG. 2, 3, and 4a–f.

FIG. 5 is a state diagram of the logic used by the embodiment of the inventive mode transitioning system 10 depicted in FIG. 2–3, and conceptually presented in FIG. 4a–f. The state machine 50 is of synchronous type and is clocked by the clock signal from the oscillator 35 (FIG. 3). The clock signal may, for example, cycle at 2 MHz. The actual frequency is, however, merely a matter of design choice and may be chosen to be much higher or lower.

The state machine 50 has six states 52a–f (shown as circle icons, while box icons are used for the various signals). An IDLE state 52a is provided for shutdown responsive to an external request at the SHDN pin of the integrated circuit 28, or to an under voltage lockout, or to a thermal shutdown. A CLSTR state 52b is provided for current-limiting or start-up with a resistor connected from $V_{IN}$ to $V_{OUT}$, an optional "soft-start" feature. A CLSTW state 52c is provided for current-limiting or start-up with 1:10 size output switches, another optional "soft-start" or fault protection feature. As can be appreciated, about half of the content of FIG. 5 is related to the handling of start-up and fault conditions, which are of serious concern in useful embodiments but are not germane to the mode transitioning system 10. It is for this reason, and to not obscure the actually germane components, that circuitry for these conventional but optional features are not included in FIG. 3.

However, of particular interest with respect to the inventive mode transitioning system 10 is the region 54. It includes a Q1D1 state 52d for providing a 1:1 step mode with full size output switches; a Q2D3 state 52e for providing a 2:3 step mode; and a Q1D2 state 52f for providing a 1:2 step mode (both also with full size output switches).

The various signals (depicted with boxes) in FIG. 5 are as follows, wherein the exclamation symbol is used as the NOT operator, a lower case "v" is used as a decimal point, and an "R" suffix indicates a register output version based on an associated output from an analog comparator. Proceeding now roughly from left to right and top to bottom in FIG. 5, an OFF signal 56 returns the state machine 50 to the IDLE state 52a, regardless of its previous state. Entry to and exit from the IDLE state 52a are asynchronous. If !(OFF) and !(VOGT0v5), i.e., when not OFF and when $V_{OUT}$ is also not greater than 0.5 volts, the state machine 50 may proceed from the IDLE state 52a to the CLSTR state 52b. Alternately, if !(OFF) and VOGT0v5, i.e., when not OFF and when $V_{OUT}$ is greater than 0.5 volts, the state machine 50 may proceed directly from the IDLE state 52a to the CLSTW state 52c.

It should be recalled that in the CLSTR state 52b a resistor is connect across the input and output terminals as a soft-start protective feature. This limits the initial surge of inrush current when $V_{OUT}$ is very low ($V_{OUT}<0.5$ volts), e.g., on initial start up. Also recall that in the CLSTW state 52c only 1:10 size output switches are used. This is also as a protective feature, but instead one to protectively limit current while determining the presence of output shorting or overloading.

If the state machine 50 is in the CLSTR state 52b it may proceed to the CLSTW state 52c once VO0v5R, i.e., when $V_{OUT}$ is within 0.5 volts of regulation. Conversely, if the state machine 50 is in any of the CLSTW state 52c, Q1D1 state 52d, Q2D3 state 52e, or Q1D2 state 52f it may return to the CLSTR state 52b in response to a !(VO0v5) signal 58, i.e., when $V_{OUT}$ is not greater than 0.5 volts for some reason. Entry to the CLSTR state 52b is thus asynchronous, while exit from it is synchronous. Entry to the other states is synchronous and exit is also synchronous, except in response to the OFF signal 56 or the !(VO0v5) signal 58. The state machine 50 may proceed from the CLSTW state 52c to the Q1D1 state 52d if INREG or T4MS, i.e., when in regulation or it has already been in the CLSTW state 52c for 4 milliseconds.

As noted, much of FIG. 5 is related to the handling of start-up and fault conditions, and the above discussion is not particularly relevant to the inventive mode transitioning system 10, but rather to the pragmatic needs of a charge pump 12 which will survive in the real world. We now turn to the region 54, which is the area of FIG. 5 that is particularly relevant to the invention.

Once the state machine 50 enters the Q1D1 state 52d it will remain there, performing in the least efficient 1:1 step mode, until INREG and OK2D3R (or the !(VO0v5) signal 58 occurs, as described above). INREG simply means in regulation, which can be determined using the output detection sub-circuit 34 of FIG. 3. OK2D3R is based on $V_{IN}$ and $V_{OUT}$. In the preferred embodiment, OK2D3R is a register output (hence the "R" suffix) indicating whether an analog comparator has determined if $V_{IN} \geq (V_{OUT} \times 1.5)$. The use of register outputs for this, and other signals, provides useful signal locking for device control and protection. It follows that the state machine 50 is not permitted to proceed from the 1:1 step mode to the more efficient 2:3 step mode (Q2D3 state 52e) until $V_{OUT}$ is in regulation and $V_{IN}$ sufficiently exceeds $V_{OUT}$ to make 2:3 step mode operation feasible.

Once the state machine 50 enters the Q2D3 state 52e it will remain there until: it is deemed appropriate to proceed to the yet more efficient Q1D2 state 52f; it is necessary to return to the less efficient Q1D1 state 52d, say, because of increased loading; or the !(VO0v5) signal 58 occurs, say, due to sever overloading or shorting of the output. The determination to proceed to the Q1D2 state 52f is based on INREG and OK1D2R, wherein INREG again means in regulation and OK1D2R is a register output indicating whether an analog comparator has determined if $V_{IN} \geq (V_{OUT} \times 2)$. The determination to return to the Q1D1 state 52d is based on whether !(OK2D3R) and !(REG2C), wherein !(OK2D3R) is the inverse of the OK2D3R component, described above, and !(REG2C) means that regulation was not reached within the last two consecutive pulses of the clock signal (FIG. 3).

Once the state machine 50 enters the Q1D2 state 52f it will remain there until: it is necessary to return to the less efficient Q1D1 state 52d; or the !(VO0v5) signal 58 occurs. The determination to return to the Q2D3 state 52e is based on !(OK1D2R) and !(REG2C), as described above.

Since the above discussion is quite detailed, it can be helpful to review FIG. 5 from the perspective of a simplified typical operating scenario. For the sake of this example, assume that $V_{IN}$ will be greater than twice $V_{OUT}$, that only a light output load is initially present, and particularly that no fault conditions are present. On the initial application of $V_{IN}$ the state machine 50 will sequentially proceed from the IDLE state 52a; to the CLSTR state 52b, because $V_{OUT}<0.5$ volts; to the CLSTW state 52c, once $V_{OUT} \geq 0.5$ volts; to the Q1D1 state 52d, usually because 4 milliseconds has elapsed; to the more efficient Q2D3 state 52e, once $V_{OUT}$ is in regulation and further because $V_{IN}$ will be greater than 1.5 times $V_{OUT}$ then; and onward to the most efficient Q1D2 state 52f, because $V_{IN}$ will be greater than twice $V_{OUT}$. As long as the above noted initial assumed conditions apply, the state machine 50 will efficiently continue operation in the Q1D2 state 52f. Aside from the abnormal occurrence of a fault condition, two things may typically now occur. First, the output load may increase, causing $V_{OUT}$ to drop out of regulation, and once out of regulation for two cycles causing the state machine 50 to return to the higher current but less efficient Q2D3 state 52e. If the state machine 50 can bring $V_{OUT}$ back into regulation within two cycles it will operate now in the medium efficient Q2D3 state 52e, otherwise it will return to the highest current and less efficient Q1D1 state 52d. The second thing that can typically happen is that $V_{IN}$ drops. If $V_{IN}$ becomes less than twice $V_{OUT}$, the state machine 50 will return to the higher current and less efficient Q2D3 state 52e. And if $V_{IN}$ becomes less than 1.5 times $V_{OUT}$, the state machine 50 will return to the highest current and less efficient Q1D1 state 52d.

The example of the inventive mode transitioning system 10 discussed herein has been based on input to output voltage step-down using the three particular step-down ratios of 1:1, 2:3, and 1:2. Those skilled in the electronic arts will readily appreciate that this is but one possible embodiment of the present invention, and that the invention has clear applicability extending far beyond this one limited example. Furthermore, it would be understood by one skilled in the art that alternative implementations of a hardware design suitable to carry out the functions of the state diagram described in FIG. 5 may be used.

For example, while the example herein is of a step-down type charge pump 12, once the principles of the mode transitioning system 10 are understood it can be seen that it can be adapted to provide multiple-mode step-up type charge pumps. As has already been described to some extent in parent U.S. patent application Ser. No. 09/369,670, which is incorporated herein by reference, the present invention can be used for charge pumps able to alternate between step-up and step-down modes of operation. And improving upon voltage inverting charge pumps using the invention is also now possible and, in fact, easy in view of the teachings herein.

Furthermore, while the example herein is of a 1:1,2:3, and 1:2 mode type charge pump 12, once the principles of the mode transitioning system 10 are understood it can be seen that it can be adapted to provide charge pumps having other, additional, or fewer such ratios. Notable in this respect is that the parent U.S. patent application Ser. No. 09/369,670 provides only two modes. It should also be appreciated that while all of the flying capacitors are connected and employed in all three modes in the example herein, that is also not a requirement. Indeed, in some embodiments the flying capacitors may intentionally be left unconnected or shorted in some modes. The inventors did both of these in an early three mode embodiment, but found the current providing capability of the present example embodiment to be more satisfactory.

In addition to the above mentioned examples, various other modifications and alterations of the inventive mode transitioning system 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The use of charge pumps is increasingly desirable to meet our society's growing dependence on systems employing electronics circuits, particularly when those circuits must be small, light weight, or battery operated. Charge pumps can flexibly receive direct current (DC) input power across ranges of voltage and convert it to DC output power to accommodate varying output loads. Charge pumps which can change between step modes are particularly able to do this using wide ranges of DC input voltage. Charge pumps may be made large or small, in assemblies ranging from discrete component to monolithic integrated circuit based embodiments. They also use economical and otherwise desirable components, notably including capacitors rather than inductors. Employing charge pumps is also well, or at least easily, understood by circuit designers.

However, charge pumps have some disadvantages. Somewhat contrary to popular belief, they are not particularly efficient. Further, due to their oscillator based nature and the current flow as they transfer charge quanta from capacitive input to output reservoirs, they can produce undesirable output voltage ripple.

The present mode transitioning system 10 is well suited for application in charge pumps because it reduces both of the above noted disadvantages. The invention is more efficient than prior charge pump mode transition systems and it concurrently lowers output voltage ripple for mid through low loads. These advantages will permit use of charge pumps employing the invention in a broader range of new applications, as well as provide benefits in many existing applications. Some larger, heavier, and inductor based power conversion means may now be replaced with charge pumps, permitting smaller, lighter, and otherwise improved overall power conversion systems. Where step mode changing type charge pumps have already been used, they may now be made more efficient. This is particularly important for battery powered circuits, wherein use of the inventive mode transitioning system 10 will permit longer use before disposable batteries must be replaced or rechargeable ones must be charged.

The present mode transitioning system 10 is also relatively easily and economically implemented. It may employ discreet or integrated circuit technologies, and in the case of the latter such may by monolithically implemented. It requires no particular expensive or additional material, being directly includable in some charge pump integrated circuits with effectively no increase in materials cost. The invention can also use well and widely understood logic principles. In sum, once the principles of the invention herein disclosed are appreciated, its implementation should pose no particular problems to those of reasonable skill in the electronics arts.

For the above, and other, reasons, it is expected that the mode transitioning system 10 of the present invention will have widespread industrial applicability. Therefore, it is expected that the commercial utility of the present invention will be extensive and long lasting.

What is claimed is:

1. A method for operating a charge pump to convert an input signal exhibiting an input voltage to an output signal exhibiting an output voltage, wherein the charge pump includes an oscillator producing clock cycles in which a plurality of flying capacitors are charged during first halves of the clock cycles and discharged during the other halves of the clock cycles, the method comprising the steps of:
   (a) operating the charge pump for at least one of the clock cycles in a first step mode defined by a first interconnecting combination of the plurality of flying capacitors while they are both charged and discharged;
   (b) determining whether the charge pump is within regulation based on whether the output voltage is within a desired range;
   (c) comparing the input voltage and the output voltage to determine whether the charge pump can operate in a second step mode defined by a second interconnecting combination of the plurality of flying capacitors while they are both charged and discharged; and
   (d) transitioning operation of the charge pump from said first step mode to said second step mode whether both said step (b) and said step (c) evaluate as true.

2. The method of claim 1, wherein it is more efficient to operate the charge pump in said second step mode than in said first step mode.

3. The method of claim 1, further comprising:
   (e) checking whether evaluation of said step (b) as true has only occurred within the last of a pre-set quantity of the clock cycles, to determine whether the charge pump has only recently achieved regulation;
   (f) repeating said step (c); and
   (g) transitioning operation of the charge pump from said second step mode back to said first step mode whether said step (e) evaluates as true and whether said step (f) now evaluates as false.

4. The method of claim 1, wherein the charge pump performs step-up voltage conversion, wherein the input voltage is lower than the output voltage and a first step ratio is greater than a second step ratio.

5. The method of claim 1, wherein the charge pump performs step-down voltage conversion, wherein the input voltage is greater than the output voltage and a first step ratio is lower than a second step ratio.

6. The method of claim 1, further comprising:
   (e) operating the charge pump in said second step mode for at least one of the clock cycles;
   (f) repeating said step (b);
   (g) comparing the input voltage and the output voltage to determine whether the charge pump can operate in a third step mode defined by a third interconnecting combination of the plurality of flying capacitors while they are both charged and discharged; and
   (h) transitioning operation of the charge pump from said second step mode to said third step mode whether both said step (f) and said step (g) evaluate as true.

7. The method of claim 6, wherein it is more efficient to operate the charge pump in said third step mode than in said second step mode and it is also more efficient to operate the charge pump in said second step mode than in said first step mode.

8. The method of claim 6, further comprising:
   (i) checking whether evaluation of said step (f) as true has only occurred within the last of a pre-set quantity of the clock cycles, to determine whether the charge pump has only recently achieved regulation;
   (j) repeating said step (g); and
   (k) transitioning operation of the charge pump from said third step mode back to said second step mode whether said step (i) evaluates as true and whether said step (j) now evaluates as false.

9. The method of claim 6, wherein the charge pump performs step-up voltage conversion, wherein the input voltage is lower than the output voltage, a first step ratio is greater than a second step ratio, and said second step ratio is greater than a third step ratio.

10. The method of claim 6, wherein the charge pump performs step-down voltage conversion, wherein the input voltage is greater than the output voltage, a first step ratio is lower than a second step ratio, and said second step ratio is lower than a third step ratio.

11. A charge pump for converting an input signal exhibiting an input voltage to an output signal exhibiting an output voltage, the charge pump comprising:

an input terminal, an output terminal, and a common terminal, wherein the input signal is received across said input terminal and said common terminal and the output signal is produced across said output terminal and said common terminal;

a plurality of flying capacitors;

a plurality of switches capable of connecting at least some of said flying capacitors together into a plurality of interconnected combinations;

said plurality of switches further capable of connecting at least some of said plurality of interconnected combinations across said input terminal and said common terminal as an input combination;

said plurality of switches yet further capable of connecting at least some of said plurality of interconnected combinations across said output terminal and said common terminal as an output combination, to transfer a charge quanta to the output signal;

an input detector suitable for determining a voltage relationship between the input voltage and the output voltage;

an output detector suitable for determining a regulation condition based on whether the output voltage is within a desired range;

an oscillator circuit producing clock cycles;

a control circuit able to selectively operate the charge pump in a plurality of step modes, wherein each said step mode is defined by how said input combination and said output combination of said interconnected combinations of said plurality of flying capacitors produce a step ratio between the input voltage and the output voltage;

said control circuit further able to determine from said regulation condition and said voltage relationship whether to selectively attempt operation of the charge pump in a more desirable of said step modes or to attempt operation in a more capable of said step modes; and said control circuit yet further able to direct connection of said input combination during one half of a said clock cycle and connection of said output combination during the other half of a said clock cycle, to obtain said charge quanta from the input signal and transfer said charge quanta to the output signal.

12. The charge pump of claim 11, wherein said plurality of switches are capable of connecting less than all of said flying capacitors which are contributively connected into either of said input combination or said output combination, to increase the quantity of said interconnected combinations and thus also said step ratios between the input voltage and the output voltage of the charge pump which are possible.

13. The charge pump of claim 11, wherein said plurality of switches includes MOSFETs.

14. The charge pump of claim 11, wherein said input detector includes a plurality of comparators, each of said plurality of comparators corresponding to a respective one of said step modes.

15. The charge pump of claim 11, wherein said output detector includes:

a voltage reference producing a reference signal; and a comparator receiving said reference signal and a portion of the output signal exhibiting the output voltage and said comparator producing a regulation signal there from.

16. The charge pump of claim 15, wherein said oscillator circuit includes a gate controlled by said regulation signal to selectively provide and cease providing said clock cycles, and thus transference of said charge quanta, based on said regulation condition.

17. The charge pump of claim 11, wherein said step modes produce voltage relationships between the input signal and the output signal which include at least one member of the set consisting of voltage step-up, voltage step down, and voltage inversion.

18. The charge pump of claim 11, wherein:

said more desirable of said step modes is more desirable because operation of the charge pump is more efficient in it than in a present said step mode; and said more capable of said step modes is more capable because operation of the charge pump in it provides more output current than in a present said step mode.

19. The charge pump of claim 11, wherein said plurality of switches and said oscillator circuit are integrated within a monolithic integrated circuit.

20. The charge pump of claim 19, wherein said input detector and said output detector are further integrated within said monolithic integrated circuit.

* * * * *